United States Patent [19]
Holt et al.

[11] Patent Number: 4,669,369
[45] Date of Patent: Jun. 2, 1987

[54] PISTON AND PISTON RING ASSEMBLIES

[75] Inventors: Jeremy Holt, Bradford; David A. Parker; Brian L. Ruddy, both of Rugby, all of England

[73] Assignee: AE Plc, Warwickshire, England

[21] Appl. No.: 690,881

[22] Filed: Jan. 14, 1985

Foreign Application Priority Data

Jan. 12, 1984 [GB] United Kingdom ............... 84.00750

[51] Int. Cl.⁴ .............................................. F01B 31/10
[52] U.S. Cl. ........................................ 92/160; 92/193; 92/198; 123/193 P
[58] Field of Search ................. 92/160, 158, 193, 195, 92/198; 123/193 P

[56] References Cited

U.S. PATENT DOCUMENTS

| | | | |
|---|---|---|---|
| 2,200,015 | 5/1940 | Alexandrescu | 92/160 |
| 2,656,228 | 10/1953 | Marien | 92/160 |
| 2,857,218 | 10/1958 | Pachernegg | 92/160 |
| 3,759,148 | 9/1973 | Geffroy | 92/160 |
| 3,926,095 | 12/1975 | Weigle | 92/160 |
| 4,516,481 | 5/1985 | Geffroy et al. | 92/158 X |

*Primary Examiner*—Edward K. Look
*Attorney, Agent, or Firm*—Leydig, Voit & Mayer

[57] ABSTRACT

A two ring piston and piston ring assembly has an upper thin steel compression ring and a lower ring which is thicker than the compression ring and which acts both as a compression ring and an oil control ring. The lower piston ring is made of a material which is more conformable than steel, for example a plastics material, which may be reinforced. In this way, effective sealing is provided using only two piston rings, while the frictional forces between the piston and an associated cylinder are reduced.

20 Claims, 11 Drawing Figures

PISTON AND PISTON RING ASSEMBLIES

BACKGROUND TO THE INVENTION

1. Field of the Invention

The invention relates to piston and piston ring assemblies for internal combustion engines.

Pistons and associated piston rings are designed to reciprocate in a cylinder of an internal combustion engine. Combustion of fuel takes place above a crown of the piston and the pressure generated on combustion reciprocate the piston within the cylinder. The gap between the piston and the associated cylinder is commonly closed by three or more piston rings carried in respective grooves formed in a ring band extending around the crown of the piston. The rings exert an outward pressure against the associated cylinder or liner.

These piston rings function to provide a seal between the piston and the associated liner preventing the combustion products from passing down the gap between the piston and the associated cylinder. In addition, these rings control the film of oil which is provided on the cylinder wall to lubricate the reciprocation of the piston and rings and to aid the gas seal, so that excessive amounts of oil do not reach the combustion chamber while an adequate oil film is maintained.

The cylinder in which a piston reciprocates may be nominally truly cylindrical when the engine is cold, but as the engine reaches operating temperatures the shape of the cylinder will distort, in a way which depends on a number of factors, including the way in which the cylinder is formed and the mechanical loading of the cylinder in operation. The distortion of the cylinder is not constant along the axial length of the cylinder neither is it constant around the circumference of the cylinder. For this reason, it is not possible to design the piston rings to be an exact fit in a particular nominal cylinder size; they must be designed to conform as far as possible to the shape of the cylinder under all conditions and to the changes in shape along and around the cylinder. To achieve this, the piston rings are arranged to exert such an outward pressure on the associated cylinder, either due to inherent resilience of the spring or due to separate spring arrangements, that the shape of the rings tend to conform to changes in the shape of the cylinder.

2. Review of the Prior Art

In order to achieve this, and to provide a piston ring with an acceptable rate of wear, it has been proposed to form the rings of steel which, because of their bending characteristics, must be arranged to exert high pressures on the associated cylinder in order to achieve the required conformability.

The use of such steel rings has a number of consequences. The first is that, with present designs, experience has shown that it is necessary to have at least three rings; the two rings closest to the crown being conformed to provide seals preventing the passage of combustion products between the piston and the associated cylinder; so-called 'compression' rings. The third, lowermost ring, is conformed to control the oil film on the associated cylinder; a so-called 'oil control' ring. The presence of three steel rings all pressing against the associated cylinder with high outward pressures increases the frictional forces between the piston and the associated cylinder. Such frictional forces reduce the power output of the engine and also affect adversely the fuel consumption. The use of three rings also increases the piston height and weight and also increases the cost of the piston.

SUMMARY OF THE INVENTION

According to the invention, there is provided a piston and ring assembly for an internal combustion engine, comprising a piston having only two axially spaced piston ring grooves provided in a ring band extending around the crown of the piston, and upper and lower piston rings carried in respective ones of the piston ring grooves for exerting outward pressure against the associated cylinder, the upper ring being a relatively thin steel compression ring and the lower ring being relatively thicker and being of a material which is more conformable than the material of the upper piston ring, so that the lower piston ring acts as a combined compression and oil control ring.

BRIEF DESCRIPTION OF THE DRAWINGS

The following is a more detailed description of some embodiments of the invention, by way of example, reference being made to the accompanying drawings in which.

DESCRIPTION OF THE PREFERRED EMBODIMENTS

Figure 1:
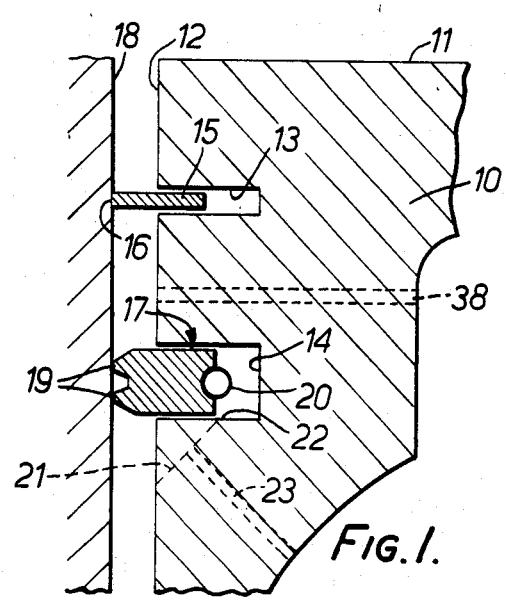
FIG. 1 is a schematic cross-section through a crown end of a piston and piston ring assembly, showing upper and lower piston rings in contact with an associated cylinder.

The crown 11 may be reinforced with fibres or whiskers or may be of steel, cast iron or a ceramic material such as silicon nitride or partially stabilized zirconium.

Only two piston ring grooves are provided in the ring band; an upper piston ring groove 13 and a lower piston ring groove 14. The piston ring grooves 13 may be reinforced by the incorporation of reinforced piston ring carriers (not shown) in order to limit the wear of the piston ring grooves by the piston rings.

The upper piston ring groove 13 contains a thin steel compression ring 15 of generally rectangular cross-section having a thickness of 1 mm or less. The surface 16 of this piston ring 15 which contacts the associated cylinder 18 may be nitro-carburised to increase its hardness and decrease its wear. This may be by the process described in British Published Application No. 2 112 025.

The lower piston ring groove 14 contains a piston ring 17 which is relatively thicker than upper ring 15 and is of a material which is more conformable than the material of the upper compression ring 15. For example, this piston ring may be formed of a fibre reinforced metal or of a suitable low modulus ferrous material. Alternatively, this ring 17 may be formed of a conformable non-metallic material such as a tough crystalline thermo-plastics material. An example of this is polyetheretherketone. This is a tough crystalline thermo-plastic aromatic polyetherketone containing the repeating unit

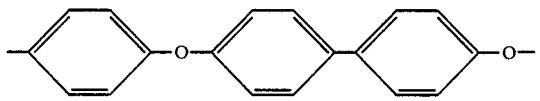

and having an inherent viscosity of at least 0.7. The polyetheretherketone may be made by the poly-condensation of hydro quinone and of 4-4'-dihalobenzophenone (a proportion of which is 4-4'-difluorbenzophenone) and an alkaline metal carbonate or bicarbonate, as described in European Patent Publication No. 001879. The polyetheretherketone may be unreinforced or may be reinforced with carbon fibres which may be randomly arranged or may be orientated to extend, for example, around the piston ring 17. In addition, bronze, graphite or polytetrafluoroethylene may be added to the polyetheretherketone either together or separately.

The piston ring 17 is produced by forming the polyetheretherketone, together with any additives, into a helical coil. This is preferably done by extrusion although it may be done by casting. The cross-section of the coil is the required cross-section of the finished piston ring.

The coil is then slit along one side in a plane including its longitudinal axis to form a number of piston rings each having a gap therein.

Alternatively, the piston rings may be produced by injection moulding the rings to size without any further finishing. A spring and/or a sealing assembly may be incorporated into or connected to the piston rings during moulding.

The cylinder contacting surface of the piston rings 17 may be provided with a wear-resistant coating applied by spraying or by electroless plating. The coating may be of any suitable material such as molybdenum or partially stabilized zirconium.

The piston ring 17 is of generally rectangular cross-sectional shape but is provided with upper and lower trapezoidal cross-section projections 19 whose narrower ends bear against the associated cylinder 18. The piston ring 17 is received in the lower piston ring groove 14 and is urged outwardly by a metallic expander element 20 arranged between the radially inner ends of the piston ring 17 and the piston ring groove 14. It is possible, however, for the piston ring to be urged outwardly against the associated cylinder or liner 18 by its own natural resilience. In either event, the outward force is such that the pressure between the piston ring 17 and the associated cylinder or liner 18 is between 0.03 and 0.66 MN/m$^2$ and is preferably of the order of 0.13 MN/m$^2$.

As shown in broken line in FIG. 1, a chamfer 21 may be provided between a lower radially extending surface 22 of the lower piston ring groove 14 and the ring band 12, with an oil drainage hole 23 leading from this chamfer to the interior of the piston. Preferably the holes are provided adjacent the thrust and counterthrust surfaces of the piston only.

As also shown in broken line in FIG. 1, drainage holes, one of which is shown at 38, may additionally or alternatively, be provided in the ring band 12 between the piston ring grooves 12, 14. These holes 38 lead from this surface to the interior of the piston, for a purpose to be described below. There may, for example, be between 2 and 10 such holes 38 having a total area of, for example, about 18 mm$^2$ e.g. there may be 8 equiangularly spaced holes each 1.75 mm in diameter. Although the holes 38 are shown with its axis lying in a plane normal to the piston axis, it will be appreciated that the holes may be inclined in either direction relative to such a slope.

Figure 2:
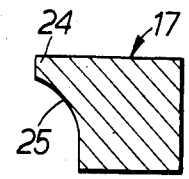
FIGS. 2, 3, and 4 show alternative cross-sections of the lower piston ring of FIG. 1.
Figure 3:
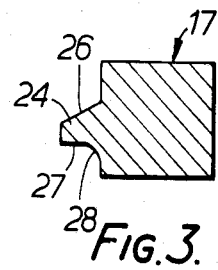
Figure 4:
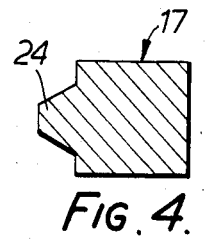

FIGS. 2 to 4 show alternative cross-sections of the lower piston ring 17 to promote downward oil scraping action. In the embodiment of FIG. 2, the piston ring 17 is provided with an outward projection 24 which is connected to the remainder of the piston ring by a curved portion 25.

In FIG. 3, a projection 25 is also provided which is formed by an upper downwardly and outwardly extending surface 26 and by a lower generally radially extending surface 27 connected to the remainder of the piston ring by a curved portion 28. In the embodiment of FIG. 4, a projection 25 is also provided which is arranged centrally on the outer surface of the piston ring and is of generally trapezoidal cross-section narrowing towards it free end.

It will be appreciated that the rings of FIGS. 2 to 4 may be used either with or without a separate spring, such as the coil spring 20.

In operation of the piston assembly of FIG. 1, or the piston assembly of FIG. 1 as modified by FIGS. 2, 3 or 4, the assembly reciprocates in the cylinder or liner 18 as a result of fuel combustion taking place above the crown 11. The thin steel compression ring 15, because of its low inertia, will remain on the bottom side of the groove when the piston is at top dead centre firing, and so provides an excellent seal against the passage of hot combustion gases between the piston 10 and the cylinder 18. In addition, the low mass of this steel ring adds little to the weight of the piston assembly. The nitro-carburised surface 16 improves the wear characteristics of the ring. Further, the small area of contact between this top piston ring and the cylinder reduces the frictional forces generated between the ring and the cylinder during reciprocation of the piston 10, despite the high pressures which are necessary in order to achieve the required conformability of this ring 15. Although, when the engine is not firing, this piston ring 15 generates lower pressures against the associated cylinder or liner than the lower piston ring 17, the effect on the upper ring 15 of the gas pressures encountered during firing is to increase this outward pressure substantially, so ensuring a tight seal between this ring 15 and the associated cylinder or liner. This operational outward pressure will, in general, be greater than the dynamic outward pressure generated by the lower ring 17.

The more highly conformable lower piston ring 17 acts partly as a compression ring to prevent blow-by and partly as an oil control ring to produce the required thickness of oil film on the surface of the cylinder 18. The high conformability of the material used for this piston ring ensures that it provides an adequate seal under all operating conditions of the engine so accommodating distortion of the cylinder 18 both axially and circumferentially. This is achieved with low outward pressures so that the lower piston ring does not suffer from high rates of wear and so that there are no high frictional forces generated between this ring and the cylinder 18.

Where the chamfer 21 and the holes 23 are provided, the excess oil scraped off by the lower ring 17 passes to the interior of the piston through such holes 23. Since the lower piston ring 17 also acts as a compression ring, there can, of course, be no holes provided in the base of the lower groove 14, as is customary.

Where the holes 38 are provided, they relieve blow-by gas pressure in the zone between the rings 15, 17. This has the effect of increasing the gas pressure drop across the top ring 15 which results in a more positive seating of this ring 15 against the associated groove 13 over a greater proportion of the piston cycle. In addition, these holes 38 will provide a positive flow path for oil drainage from the top ring 15.

Figure 5:
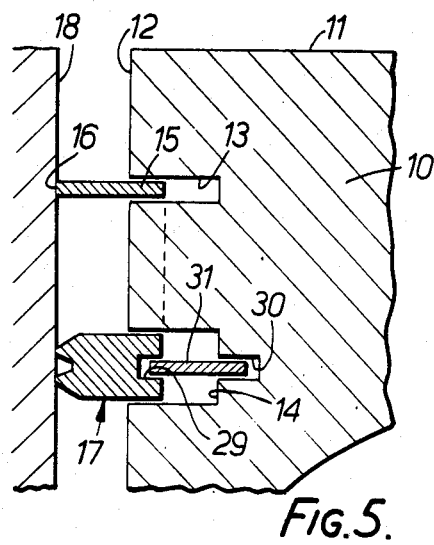
FIG. 5 is a similar view to FIG. 1 but showing a seal provided by an auxiliary ring arranged between a radially inner end of the lower piston ring and a base of an associated piston ring groove.
Figure 6:
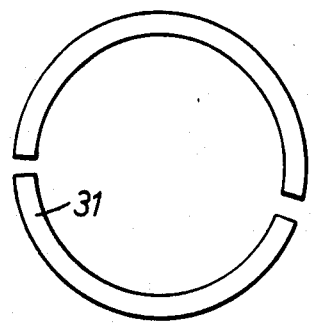
FIG. 6 shows a two-part auxiliary ring.

Referring next to FIG. 5, parts common to FIG. 1 and to FIG. 5 will be given the same reference numerals and will not be described in detail. The piston of FIG. 5 differs from the piston of FIG. 1 in the arrangement of the lower piston ring 17. A radially inner end surface of the lower piston ring 17 is formed with a channel 29, and a base of the lower ring groove 14 is also provided with a similar channel 30. The channels 29, 30 are aligned and receive spaced edges of an annular auxiliary ring 31, in the form of a steel rail. The auxiliary ring 31 may be formed in two or more segments (see FIG. 6) to facilitate its assembly into the piston. The ring 31 may be a tight fit in the channels 29, 30 or may be free to move in and out of the channels 29, 30.

The auxiliary ring 31 thus forms a seal against the passage of both gas and oil around the radially inner end of the lower piston ring 17. The clearances between the sides of the lower piston ring groove 14 and the sides of the piston ring 17, and between the auxiliary ring and the channels, are sufficiently small to tend to increase the pressure differential across the lower piston ring 17 and produce an axial force tending to move the sides of the lower piston ring into full engagement with one or other of the radially extending walls of the lower groove 14, so providing a more effective ring-to-piston sealing.

Thus the presence of the auxiliary ring 31 aids the lower piston ring 17 in forming its combined functions as a compression ring in an oil control ring. The seal formed between the auxiliary ring 31 and the piston ring groove 14 and the piston ring 17, and the seal formed between the piston ring 17 and the piston 10 prevent the blow-by of gases. In addition, the auxiliary ring 31 prevents the passage of oil round the back of the lower piston ring and so assists in controlling the oil.

Figure 7:
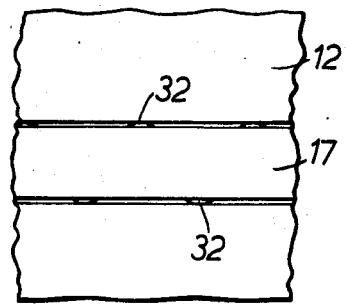
FIG. 7 is a side elevation of a part of the piston of FIG. 5 showing the lower ring modified by the addition of spacer lugs.

Referring next to FIG. 7, it is possible for the auxiliary ring 31 to act as the sole piston-to-ring seal, leaving the piston ring 17 to provide only piston-to-cylinder sealing. This may be effected by the provisions of means on the side of the compression ring preventing it sealing against the ring groove walls. This means may take the form of lugs 32 provided on the sides of the piston ring 17.

Figure 9:
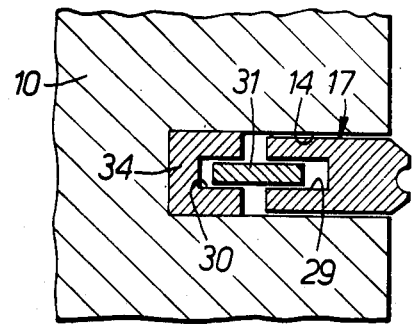
FIG. 9 is a similar view to FIG. 8 but showing an auxiliary ring-receiving groove formed in an insert held in the piston ring groove.
Figure 8:
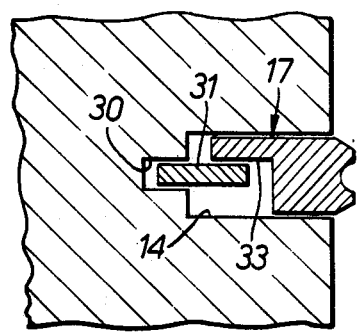
FIG. 8 shows a section through an alternative form of the lower piston ring of FIG. 5 which is formed with a rebate.

Referring next to FIG. 8, the piston ring 17 need not be provided with a channel 29; there may be only a rebate 33 extending around the radially inner end of the piston ring 17. Further, the inner end of the auxiliary ring need not seal in a channel 30 formed in the piston ring groove; as seen in FIG. 9, this channel 30 may be formed in an insert 34 held in the piston body and forming also the base of the ring groove 14. The insert 34 may be encast during casting of the piston.

Figure 10:
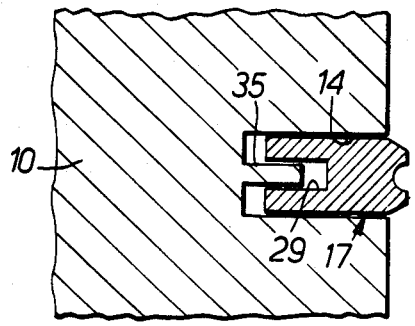
FIG. 10 is a similar view to FIGS. 8 and 9 but with a fixed projection extending from a base of the ring groove into a recess in a radially inner end surface of the lower piston ring.
Figure 11:
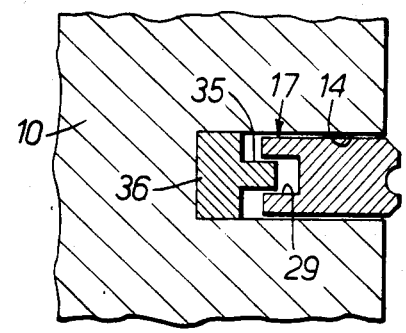
FIG. 11 is a similar view to FIG. 10 but showing the fixed projection formed on an insert held in the piston. Referring first to FIG. 1, the piston assembly comprises a piston 10 of aluminium or aluminium alloy formed with a crown 11 surrounded by a ring band 12.

Referring next to FIGS. 10 and 11, in an alternative embodiment, the auxiliary ring 31 is replaced by an annular flange 35 projecting radially outwardly from the base of the lower piston ring groove 14. The flange 35 extends into the channel 29, provided in the radially inner end surface of the lower ring 17. Of course, the projection could be formed on the piston ring 17 and the channel in the piston ring groove. As seen in FIG. 11, the projection, (or the channel) could be formed on an insert 36 held in the piston body, in the manner of the insert shown in FIG. 9.

As shown in broken line in FIG. 5, the ring band 12 may be reduced in diameter between the piston ring grooves 13, 14 so forming, with the cylinder 18, a chamber 37 extending around the piston 10 in this region. This chamber 37 reduces the pressure of any combustion gases which pass the upper piston ring 15, so reducing the required effectiveness of the lower piston ring 17 as a compression ring. A similar modification may be made to the embodiments of FIGS. 1 to 4.

We claim:

1. A piston and piston ring assembly for an internal combustion engine, comprising:
   a piston,
   a crown at an upper end of said piston,
   a ring band extending around said crown of the piston,
   upper and lower axially spaced piston ring grooves provided in the ring band as the only piston ring grooves,
   a one-piece relatively thin steel compression ring mounted in said upper piston ring groove,
   a one-piece combined compression and oil control ring which is mounted in said lower piston ring groove and which is relatively thicker than said steel compression ring, said combined compression and oil control ring being of a material which is more conformable than the material of the steel compression ring, so that said ring acts as a combined compression and oil control ring.

2. A piston and ring assembly according to claim 1, wherein the lower piston ring is made from a conformable non-metallic material such that, in operation, the piston ring has an outward pressure against an associated cylinder or liner of between 0.03 and 0.66 $MN/m^2$.

3. A piston and ring according to claim 2, wherein the outward pressure is 0.13 $MN/m^2$.

4. A piston and ring assembly according to claim 1, wherein all the outward pressure exerted by the lower piston ring is generated by the inherent resilience of the lower piston ring.

5. A piston and ring assembly according to claim 1, wherein the outward pressure exerted by the lower piston ring is at least partially generated by separate spring means between a radially inner end of the lower piston ring and the associated piston ring groove.

6. A piston and ring assembly according to claim 1, wherein the lower piston ring is made from a high temperature plastics material known as polyetheretherketone.

7. A piston and ring assembly according to claim 6, wherein the polyetheretherketone is reinforced.

8. A piston and ring assembly according to claim 1, wherein the lower piston ring is of generally rectangular cross-section.

9. A piston and ring assembly according to claim 1, wherein the lower piston ring has a generally rectangular cross-section with the upper and lower projections providing upper and lower circumferential sealing lands.

10. A piston and ring assembly according to claim 1, wherein the lower piston ring has a generally rectangular cross-section formed with only one projection providing a single sealing land.

11. A piston and ring assembly according to claim 1, wherein a seal assembly is provided within the piston ring groove accommodating the lower piston ring and between this piston ring groove and the lower piston ring for reducing or preventing fluid flow around the radially inner end of the lower piston ring.

12. A piston and ring assembly according to claim 11, wherein the piston ring groove and the lower piston ring are provided with respective aligned recesses extending therearound, the seal assembly comprising an annular auxiliary ring having two spaced edges received in the piston ring groove recess and the lower piston ring recess respectively.

13. A piston and ring assembly according to claim 11, wherein the seal assembly comprises a projecting member extending into a co-operating channel member, one member being provided in the piston ring groove and the other in the lower piston ring.

14. A piston and ring assembly according to claim 11, wherein the seal assembly provides a radially outwardly directed load on the lower piston ring.

15. A piston and ring assembly according to claim 1, wherein the piston ring groove accommodating the lower piston ring is provided, on that side of the lower piston ring remote from the crown, with means for conveying to the interior of the piston, oil removed by the lower piston ring.

16. A piston and ring assembly according to claim 15, wherein said means comprise a chamfer provided between a lower radially extending surface of the lower piston ring groove and the ring band, and holes provided in said chamfer and leading therefrom to an interior of the piston.

17. A piston and ring assembly according to claim 16, wherein said holes are provided only adjacent thrust and counterthrust sides of the piston.

18. A piston and ring assembly according to claim 1, wherein the ring band between the upper and lower piston ring grooves, is provided with at least one oil drainage hole leading therefrom to the interior of the piston for increasing the oil pressure drop across the upper piston ring.

19. A piston and ring assembly according to claim 1, wherein the ring band is of reduced diameter between the piston ring grooves to form, with the associated cylinder, an expansion chamber for reducing the pressure of combustion gases passing the upper piston ring.

20. A piston and ring assembly according to claim 1, wherein the upper steel ring has a thickness of 1 mm or less.

* * * * *